United States Patent Office 3,327,272
Patented June 20, 1967

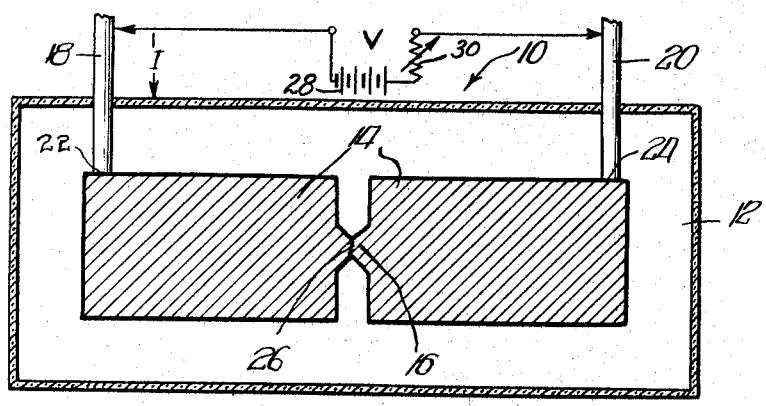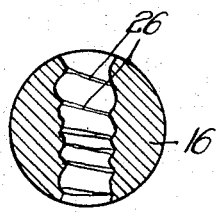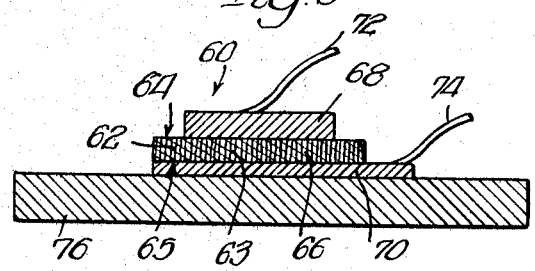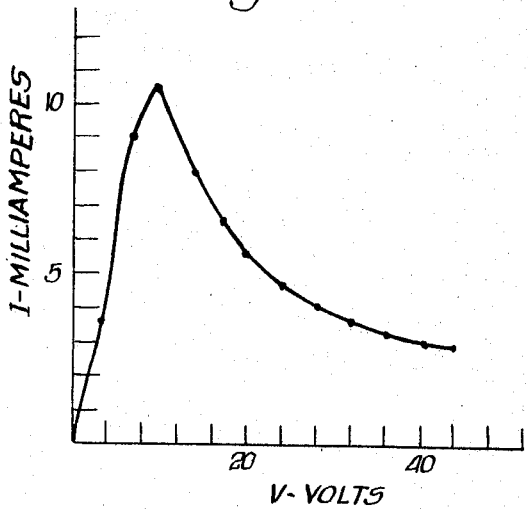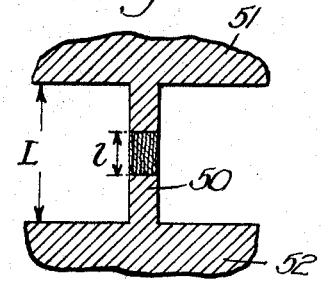
INVENTOR.
Barry J. Stern,

3,327,272
NEGATIVE RESISTANCE DEVICE
Barry J. Stern, 402 Suburban Court, Apt. 6,
Rochester, N.Y. 14620
Filed June 22, 1964, Ser. No. 376,814
2 Claims. (Cl. 338—20)

The present invention relates to novel electrical devices providing a negative resistance function and methods for producing such devices. The invention comprises a pioneer invention of new negative resistance devices utilizing previously unknown principles.

It is an object of the present invention to provide new negative resistance devices the mode of operation of which is distinct from that of any previously known negative resistance devices.

It is an object of the present invention to provide novel negative resistance devices which may be easily and inexpensively constructed from common and commercially available materials.

It is an object of the invention to provide novel two-terminal negative resistance devices which are completely non-polar in operation.

It is another object of the invention to provide novel negative resistance devices having extremely simple and reliable construction, which may be made in a very compact form.

It is a further object of the invention to provide novel methods for making negative resistance devices.

A more specific object of the invention is to provide a negative resistance device comprising basically a pair of electrodes spaced apart and joined electrically and physically by a plurality of filaments of a material having a high liquid to solid resistivity ratio, said filaments being adapted for the passage of electrical current therethrough sufficient to maintain said filaments in a partially molten state.

Further objects and features of the invention pertain to the particular arrangement and structure whereby the above identified objects and other objects of the invention are attained.

The invention, both as to the means and methods employed therein, will be better understood by reference to the following specification and the drawings forming a part thereof, wherein:

FIGURE 1 illustrates an enlarged plan view of one embodiment of a negative resistance device according to the invention.

FIGURE 2 shows a highly magnified plan view of a small portion of the embodiment of FIGURE 1, illustrating the conductive microfilaments therein.

FIGURE 3 illustrates an enlarged cross-sectional view of another embodiment of a negative resistance device according to the invention, in which the microfilaments are shown in disproportionately magnified size for better illustration.

FIGURE 4 is a simplified representation or idealized model of a single filament.

FIGURE 5 is a graph showing a plot of the electrical characteristics of an exemplary negative resistance device according to the invention, for a selected material.

Turning now to the drawings, and referring specifically to FIGURE 1, there is shown therein one particular embodiment 10 of a negative resistance device in accordance with the present invention. Basically, the device 10 and its method of construction comprises a substrate or base 12 upon which is placed by vacuum vaporizing or other suitable means a thin metal film 14 having a restricted area 16, and electrical leads 18 and 20 fastened to respective ends of the film 14 at electrical contacts 22 and 24, respectively. Upon supplying sufficient voltage across the leads 18 and 20 as will be explained herein and for the proper thickness of the film 14, a type of fracture will develop across the restriction 16, forming a plurality of continuous conductive filaments 26 as shown in the magnified view of FIGURE 2. Once the filaments 26 are properly formed, the device 10 provides a negative resistance, providing sufficient current is passed through the filaments 26 so that a portion of each filament is maintained in a partially molten state. The portion of each filament which is in a molten state will increase or decrease as the current is increased or decreased into the device and due to the increase in resistivity as the material changes from a solid to molten state, as will be further explained herein, the device operates as a negative resistance.

Referring to the embodiment 10 of FIGURE 1, the novel method of constructing the desired conductive filament structure will be described in further detail. The substrate or base 12 may be a clean surface of glass or other suitable material which is preferably an electrical and thermal insulator. Any shape or configuration of surface may be employed. The material to be employed is preferably in the form of a thin film 14 of metal, which may be affixed to the base 12 by any suitable means such as for example, vacuum vaporizing or coating. This metal film 14 may be of any desired configuration or size, but preferably having a thickness of greater than 1,000 angstroms over its principal portions so as to form a good electrical conductor and a suitable attachment for electrical leads. Electrical leads 18 and 20 may be fastened to the film 14 at electrical contacts 22 and 24 on opposite sides of the restricted area by conventional means such as welding or the like.

A restricted portion 16 in the film 14 may be formed by masking part of the base 12 during the coating process, by subsequent removal of portions of the metal film, or other suitable means. The horizontal dimensions of this restricted area are not critical. A purely exemplary figure would be 2 mm. by 1 mm.

The only critical dimension in the process of forming the device 10 is the thickness of the metal film 14 in the constricted region. The preferable thickness is in the range of 100 to 200 angstroms. Films substantially thicker or thinner than this range may result in an open circuit either before or after the forming process rather than the desired conductive filament formation.

The forming process for the device 10 comprises applying a slowly rising voltage between the leads 18 and 20 (and thereby primarily across the restricted region 16). The voltage is increased until a point is reached at which there is a sharp drop in the current drawn between the leads 18 and 20. At this point, an irregular physical discontinuity forms transversely across the constricted region 16 and a plurality of separate microscopic filaments that will melt and solidify stably, bridge or form across this discontinuity. Both the above forming process and the subsequent operation of the negative resistance device 10 is preferably carried out at pressures below aproximately $10^{-3}$ Torr, as for example by constructing the device 10 inside an envelope which is evacuated and sealed.

The operation of the negative resistance device 10 is quite simple. Once the device has been formed as described above, no further forming operation is needed again and the device has an indefinite life. Negative resistance operation is accomplished simply by applying sufficient voltage across the leads 18 and 20 such that the device is in its negative resistance region, i.e., the filaments are partially molten. This may be evidenced by the input voltage and current, as in this negative resistance region an increase in voltage across the leads 18 and 20 will result in a decrease in current, and vice versa. The device may be connected directly into numerous forms of electronic circuitry in which negative resistance devices may be employed, thereby providing voltage and current into the device. Such means for providing voltage and current to the filaments are exemplified by the battery 28 and potentiometer 30.

As an example of the electrical characteristics of one particular embodiment of the device 10, a plot of the measured values of input voltage versus input current for this one device, which utilized gold as the filament material, is shown in FIGURE 5. It should be noted that there can be a substantial variation in certain characteristics between these devices 10 and they are not limited to the current and voltage values shown in FIGURE 5, even for the same material. However, as described in the discussion of the theory of operation infra, the electrical parameters can be predicted from the formulas therein and are closely related to the material selected.

FIGURE 3 illustrates another negative resistance device according to the invention. The chief distinction between this device 60 and the device 10 is in the method of formation of the filaments. In the device 60 an electrical and thermal insulator 62 having opposing spaced surfaces 64 and 65 is provided with a number of fine passageways 63 or openings. These passageways run completely through the insulator 62 from the surface 64 to the surface 65. Any suitable insulator material having this sort of porous capillary structure may be used. The insulator 62 may be quite thin and may be either pre-formed or formed in place by any suitable means. The respective parts of the device 60 are shown in a somewhat exaggerated form for better illustration of the filaments 66.

To form operable conductive filaments 66 in the device 60 the passageways 63 through the insulator 62 are filled with the desired material by any suitable means, as for example, by casting molten material into the passageways. Electrical contacts 68 and 70 may then be provided at each of the two surfaces of the insulator to physically and electrically connect with the ends of the filaments 66. These electrical contacts 68 and 70 may be formed by plating, vacuum vaporizing or other suitable means, so as to form a layer of conductive material (not necessarily the same as those of the filaments) upon each of the two surfaces 64 and 65 in sufficient thickness to form good electrically and thermally conductive areas. Electrical leads 72 and 74 may then be attached in a conventional manner to the electrical contacts 68 and 70. For convenience, the entire above described structure may be secured to or formed upon a base 76. The operation of the device 60 is essentially the same as that for the device 10 described above. However, the walls of the passageways 63 give stability to the filaments 66 in their molten state. Further, the device 60 need not be operated in a vacuum, as is preferred for the device 10, and evaporation of the material in its molten state may be prevented, since the filaments may be sealed within the passageways. However, since the filaments are in complete contact with the insulator 62, changing the material of the insulator so as to utilize an insulator having significant thermal conductivity will result in changes in the electrical characteristics of the device.

The basic principle upon which the negative resistance devices of the invention operate has never been previously applied. Observations have been made in the prior art of unusual negative resistance effects occurring in certain thin metal film structures under specific conditions, e.g., in a metal-oxide-metal sandwich structure. However, the mechanism responsible for the observed negative resistance effects was completely unknown and unexplained in these experiments, and in fact, erroneously thought to be due to the employment of the oxide layer. The present invention provides the true explanation for these previously observed negative resistance effects, and more importantly, provides the necessary information and explanation for those skilled in the art to construct and utilize various practicable negative resistance devices employing a new concept in which semi-conductors, oxides, or other special materials need not be employed. The term "meltistor" may be employed as an expression for these devices to distinguish them from other basic negative resistance devices.

To better explain the theory and principle of operation of negative resistance devices in accordance with the invention, FIGURE 4 represents an idealized or simplified model of a single uniform conductive filament 50 of length L, joining two large electrode areas 51 and 52 of the same material, to which are connected respectively electrical leads (not shown). $l$ represents the length of the portion of the filament 50 which is in a molten state.

Each of the large areas 51 and 52 are maintained at a constant temperature $T_a$, thus each end of the filament 50 is at that temperature. The temperature at the boundaries between the molten and solid regions of the filament 50 is, of course, $T_m$, the melting temperature of the particular solid from which the filament is made. The cross-sectional area of the filament may be represented as A (assumed constant), the resistivity of the material may be represented as $\rho$, and the thermal conductivity of the material as K. The subscripts $l$ and $s$ used herein designate the liquid or solid states respectively. The voltage applied between the two areas 51 and 52 (and, therefore, the voltage applied across the filament 50 since the resistance of the large areas 51 and 52 is insignificant in comparison to that of the filament), may be represented as V, and the current through the filament as I.

For simplification of a mathematical solution for the electrical characteristics of the model of FIGURE 4, it has been assumed that the area A of the filament does not change with the transition from the liquid to the solid state and that the voltage and temperature vary only along the direction of the longitudinal axis of the filament. Also it has been assumed that the resistivity and thermal conductivity do not vary with temperature and, therefore, have one constant value in the liquid state and another constant value in the solid state. Further, it is assumed that the initial melting will occur at the midpoint of the filament, i.e., furthest from the two heat sinks formed by the constant temperature areas 51 and 52, and that all heat flow is from the filament towards these areas, with no thermal energy escaping by any other means. These assumptions are not essential, but are a logical simplification in view of the fact that the filaments preferably are on a thermally insulated surface and in a vacuum. The valadity of the above simplifications for mathematical convenience is corroborated by the closeness of various experimentally observed results to the results predicted from the mathematical model.

As the voltage V across the filament 50 is increased, and, therefore, the current I through the filament increasd, the passage of current through the material will produce heat energy in the filament in accordance with the well-known formula $E=I^2R$, where R is equal to $\rho_s L/A$ for the filament 50 (while the filament is still in an entirely solid state). It will be observed that until melting occurs the idealized filament 50 is a conventional positive resistance, and since resistivity is assumed constant the first portion of the plot of V versus I should be a straight line. FIGURE 5, which is a plot of actual experimentally devised values for one exemplary device, shows this to be essentially correct. Applying well known thermal and electrical formulas the following solutions may be derived expressing the magnitude of the voltage V and current I necessary to initiate melting in the filament 50. These values may be expressed as "V peak" and "I peak," and:

$$V \text{ peak} = [8\rho_s K_s(T_m - T_a)]^{1/2}$$

$$I \text{ peak} = \frac{A}{\rho_s L}[8\rho_s K_s(T_m - T_a)]^{1/2}$$

It will be noted from the above that the value of V peak is completely independent of the area or length of the filament.

Deriving a mathematical solution for the relationship between voltage V and current I for the case where $l > 0$, i.e., after V peak and I peak, where a portion of the filament is in the molten state and the negative resistance region occurs, the following formula may be obtained:

$$I = \frac{A}{\rho_s L}\left\{V - \frac{(\beta - 1)}{\beta}[V^2 - 8K_s\rho_s(T_m - T_a)]^{1/2}\right\}$$

Where $\beta$ is equal to $\rho_e/\rho_s$, the ratio of liquid to solid resistivity. The plot of this equation for a $\beta$ of 25 closely approximates the negative resistance portion of the curve of FIGURE 5, which shows the measured characteristics of one device 10 made from gold, which has a $\beta$ in this range.

The formulas for the minimum voltage and minimum current for the equation above are:

$$V \text{ min.} = [8K_s\rho_s(T_m - T_a)]^{1/2}\left[\frac{\beta^2}{2\beta - 1}\right]^{1/2}$$

$$I \text{ min.} = \frac{A}{\rho_s L}[8K_s\rho_s(T_m - T_a)]^{1/2}\left[\frac{2\beta - 1}{\beta^2}\right]^{1/2}$$

In combination with the equations for V peak and I peak it may be derived that:

$$\frac{V \text{ peak}}{V \text{ min.}} = \left[\frac{2\beta - 1}{\beta^2}\right]^{1/2}$$

$$\frac{I \text{ peak}}{I \text{ min.}} = \left[\frac{\beta^2}{2\beta - 1}\right]^{1/2}$$

It may be seen from the above equations that the value of $\beta$, the ratio of the liquid resistivity to the solid resistivity of the selected material, is the principal factor in determining the negative resistance characteristics of the devices. The equations as well as experimental results show that the operation of the devices is independent of the polarity of the voltage and current applied, and that the voltage maximums are independent of both the area and the length of the filaments, so that this value is approximately the same for devices having filaments of randomly varying lengths and areas. However, the voltage maximums are affected by the properties of the material.

While the mathematical model of FIGURE 4 is for a single element, the formulas derived therefrom are applicable to a complete device having a plurality of filaments. Further, it will be observed that the negative resistance characteristics of each filament cause a "balancing" effect preventing one filament from increasing its share of the total current load excessively in proportion to the other filaments, even if the initial solid state resistance of the filament should be lower due to a greater area or shorter length.

Experimental evidence indicates that there is, as would be expected, a limitation in the frequency response of the devices due to thermal time constants and overcoming the heat of fusion of the material in expanding and contracting the molten portion of the filaments. While the devices are thus basically suited for DC or low frequency operation, they do have alternating current and voltage capabilities up to a frequency limited by the thermal reaction time of the particular filament structure. Specific embodiments of the device 10 have been operated successfully at a 60 cycle frequency.

The chief limitation upon the diameter of the filaments (other than the desired current level) would seem to be imposed by the preferability of maintaining the filaments in a stable position even during their molten state, to prevent shorts or open circuits and to reduce noise. Where the filaments are not physically confined to insure their non-movement, as in the device 60, this stability would appear to be primarily provided by surface tension effects, therefore microfilaments of relatively small diameter, in the order of 100 to 200 angstroms, are preferred.

The selection of the materials to be employed in the filaments of the negative resistance devices of the invention will, of course, primarily be based upon the desired negative resistance characteristics and hence upon the $\beta$ of the particular material. Almost all metals have a positive $\beta$ and are electrical conductors, and hence are capable of utilization. Gold has one of the highest values of $\beta$ and has a preferred relatively low melting point, of approximately 1063° C. Further, gold may be practically operated under the preferred vacuum conditions due to its very low vapor pressure at its melting point, i. e., very little of the material is lost by vaporization from the molten filaments. However, it is not intended to limit the invention to the utilization of metals or one particular metal, but to include any present or future materials, organic or inorganic, including compounds, mixtures or alloys, which exhibit a positive $\beta$ and are electrically conductive to some extent.

While the devices described herein employ thermal conduction from the filament to the adjoining electrical contact areas as the principal means of heat transference, is to be appreciated that various means may be adopted for changing this heat transfer pattern, as for example by providing external cooling or heating to the filaments or to the adjoining areas, thereby changing the electrical characteristics of the device.

The invention is not limited to structures formed in the manner described herein. For example, an operable conductive filament structure providing a negative resistance device in accordance with the invention may be formed by plating, etching, electro-forming, drawing or other suitable means.

It is contemplated that numerous variations and modifications within the purview of those skilled in the art can be made in the negative resistance devices and the methods of constructing same herein, and it is intended to cover in the appended claims all such variations and modifications as fall within the true spirit and scope of the invention.

What is claimed is:

1. A device, the current versus voltage characteristic of which has a positive and negative resistance region when measured in a vacuum, said device comprising a pair of spaced electrodes, said electrodes comprising vacuum vapor coated 1000 A. metal films deposited on a glass substrate, electrical leads attached to said electrodes, at least one filament electrically and thermally joining said pair of electrodes, said at least one filament having a length of .1 cm. and a cross-sectional area of $10^{-10}$ cm.$^2$, said at least one filament supported by said glass substrate, said at least one filament comprising an electrical and thermal material having a liquid to solid resistivity ratio greater than one and having a characteristic such that when a predetermined electrical current is passed through said at least one filament, the center section of said at least one filament becomes molten, said substrate and surface tension maintaining said molten section of said at least one filament in electrical and thermal contact with the solid sections of said at least one filament.

2. The device of claim 1 wherein said support comprises a layer of electrical insulating material having a pair of spaced surfaces, said insulating material having at least one passageway therethrough opening unto said pair of surfaces, said at least one filament within said at least one passageway, said pair of electrodes associated with each of said surfaces connected to the ends of said at least one filament.

References Cited

UNITED STATES PATENTS

| | | | |
|---|---|---|---|
| 2,183,755 | 12/1939 | Schottky | 338—25 |
| 2,273,704 | 2/1942 | Grisdale | 252—504 |
| 2,487,279 | 11/1949 | Stalhane | 338—22 X |
| 2,609,470 | 9/1952 | Quinn | 338—22 |
| 2,660,640 | 11/1953 | Wolf | 338—100 X |
| 2,744,981 | 5/1956 | Spears | 200—113.3 |
| 2,796,505 | 6/1957 | Bocciarelli | 338—20 |
| 2,880,181 | 3/1959 | Williams | 252—514 |
| 2,899,657 | 8/1959 | Quade et al. | 338—223 X |
| 2,978,314 | 4/1961 | Krause | 252—514 X |
| 2,978,665 | 4/1961 | Vernet et al. | 338—223 |
| 3,134,689 | 5/1964 | Pritikin et al. | 117—212 |
| 3,200,010 | 8/1965 | Place | 117—212 |
| 3,209,298 | 9/1965 | Evanicsko | 338—20 X |
| 3,210,831 | 10/1965 | Johnson et al. | 338—327 X |
| 3,225,320 | 12/1965 | Solomons | 338—22 |

FOREIGN PATENTS 872,833  7/1961  Great Britain.

RICHARD M. WOOD, *Primary Examiner.*

W. D. BROOKS, *Assistant Examiner.*